US008504640B2

(12) United States Patent
Rios et al.

(10) Patent No.: US 8,504,640 B2
(45) Date of Patent: Aug. 6, 2013

(54) DEVICE RECRUITMENT FOR STEREOSCOPIC IMAGING APPLICATIONS (75) Inventors: Edward Rios, McHenry, IL (US); Terance B. Blake, Palatine, IL (US); Gregory J. Dunn, Arlington Heights, IL (US); Boaz J. Super, Westchester, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 546 days.

(21) Appl. No.: 12/476,754

(22) Filed: Jun. 2, 2009

(65) Prior Publication Data
US 2010/0306335 A1 Dec. 2, 2010

(51) Int. Cl.
G06F 15/16 (2006.01)
(52) U.S. Cl.
USPC .............. 709/211; 348/47; 348/48; 348/211.3
(58) Field of Classification Search
USPC ........................... 709/211; 348/47, 48, 211.3
See application file for complete search history.

(56) References Cited

U.S. PATENT DOCUMENTS

| 6,009,359 | A  | * | 12/1999 | El-Hakim et al. | 701/28 |
| 6,781,618 | B2 | * | 8/2004  | Beardsley | 348/43 |
| 7,460,781 | B2 | * | 12/2008 | Kanai et al. | 396/263 |
| 7,571,227 | B1 | * | 8/2009  | Pabla | 709/224 |
| 2002/0024517 | A1 | * | 2/2002 | Yamaguchi et al. | 345/424 |
| 2002/0176499 | A1 | * | 11/2002 | Tatsuzawa | 375/240.12 |
| 2004/0160640 | A1 | * | 8/2004 | Corrales et al. | 358/1.18 |
| 2006/0044307 | A1 | * | 3/2006 | Song | 345/419 |
| 2006/0064533 | A1 | * | 3/2006 | Rael et al. | 710/310 |
| 2006/0127840 | A1 | * | 6/2006 | Fornoff et al. | 433/77 |
| 2006/0221072 | A1 | * | 10/2006 | Se et al. | 345/420 |
| 2007/0147827 | A1 | * | 6/2007 | Sheynman et al. | 396/325 |
| 2008/0031327 | A1 | | 2/2008 | Wang | |
| 2008/0079805 | A1 | * | 4/2008 | Takagi et al. | 348/51 |
| 2008/0158346 | A1 | * | 7/2008 | Okamoto et al. | 348/47 |
| 2009/0067705 | A1 | | 3/2009 | Yu | |
| 2009/0315915 | A1 | * | 12/2009 | Dunn et al. | 345/632 |

FOREIGN PATENT DOCUMENTS

| EP | 1379063 A1 | 7/2004 |
| WO | 2006084385 A1 | 8/2006 |
| WO | 2008016882 A2 | 2/2008 |

OTHER PUBLICATIONS

Csurka, G., et al., "Closed-Form solutions for the Euclidean calibration of a stereo rig," Proceedings of the 5th European Conference on Computer Vision, Freiburg, Germany, pp. 426-442, 1998.

* cited by examiner

Primary Examiner — Tauqir Hussain
(74) Attorney, Agent, or Firm — Steven A. May (57) ABSTRACT A method of providing three dimensional (3D) information is disclosed in which a master recruits a local slave to provide contemporaneous images. The images are collected and 3D information extracted therefrom. The 3D information or various images may be transmitted to a remote device and is employed to provide a substitute background that replaces the background of the original image. Either the new image is displayed on one or both devices. The images can be collected and the 3D information extracted at either of the master or slave or at a separate device. To recruit the slave, the master broadcasts a query to all local devices, determines the available devices and their characteristics, automatically or manually selects a particular device, requests authorization from the selected device, and pairs with the selected device when authorization is received. Devices of the same or different types may be paired.

19 Claims, 8 Drawing Sheets

DEVICE RECRUITMENT FOR STEREOSCOPIC IMAGING APPLICATIONS

TECHNICAL FIELD

The present application relates to imaging. In particular, the application relates to using the cameras of multiple devices in a particular area to provide a three dimensional image.

BACKGROUND

With the advent of advanced imaging and higher processing speeds in user devices as well as networks providing greater and greater bandwidth, a variety of electronic devices have been developed fairly recently to provide real-time video images from a particular user device to various other user devices. Such devices include both stationary devices, e.g., those that are relatively immobile such as desktop computers, and mobile devices such as laptop computers for situations in which the user is present at the office, at home, or while traveling. Cameras, which have been incorporated in these devices, permit users to take images or videos of people or places and provide them to the internet. In an increasing number of circumstances, such as teleconferencing, and gaming, it is desirable to provide a three dimensional (3D) image to the user's display and/or to the remote parties.

In particular, one of the forces driving device processing speed and network bandwidth is gaming, such as on-line gaming in which multiple players interact in a simulated environment. As gaming has become increasingly complex, it is sometimes desirable for a player to provide a three dimensional image so that his/her avatar in the gaming environment is able to adequately mimic his/her movements. This permits the player to interact with a variety of objects in various parts of his/her environment without having to constantly adjust the camera.

Further, the current economic and social climate has provided incentives for teleconferencing. Often, teleconferencing is performed while traveling using mobile devices. In some cases, such as while traveling, it is desirable to replace the actual background with a substitute background. However, substitute backgrounds in non-three dimensional systems do not work well for many reasons. For example, background substitution generally operates by using an image taken without the user and an image taken with the user and replacing the aspects of the images that are the same (assumed to be the original background) with the substitute background. Such a technique only works if the background does not change, making it essentially useless if the device is moved and causing problems if shadows or other illumination differences are present or if a color of the user matches that of the original background. Such problems could be reduced if three dimensional imaging were to be employed.

To produce a three dimensional image, multiple cameras are used to provide images from different viewpoints. Unfortunately, the added hardware cost, integration complexity and bulkiness present formidable problems in incorporating additional cameras into many present mobile devices, making it unlikely that multiple cameras will be incorporated into many such devices in the near future.

It is thus desirable to be able to provide a three dimensional image without employing multiple cameras in a single device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

The apparatus and method components have been represented where appropriate by conventional symbols in the drawings, showing only those specific details that are pertinent to understanding the embodiments shown so as not to obscure the disclosure with details that will be readily apparent to those of ordinary skill in the art having the benefit of the description herein. Other elements, such as those known to one of skill in the art, may thus be present.

DETAILED DESCRIPTION

A mobile device, system, and method of providing three dimensional information are disclosed. In one embodiment, the method comprises recruiting a local device for pairing with a master device to serve as a slave device, matching at least one of image capture, image transmission or image display characteristics of the slave device with that of the master device, collecting a contemporaneous image from each of the devices after the characteristics of the devices have been matched, and extracting three dimensional information from the contemporaneous images. The three dimensional information may be employed to display an image on a screen associated with at least one of the devices.

In another embodiment the three dimensional information is transmitted to a remote device over a first communication interface. The slave device is recruited by the master device through a second communication interface that may employ a different network from the first communication interface.

In another embodiment, the original background of one or both of the images captured is replaced with a substitute background to form a replacement image. The three dimensional information is employed to provide the substitute background. The screen of the slave device may be locked such that the replacement image is displayed on the screens of both devices, it is displayed on only one of the master or slave devices while the original image with the original background is displayed on the screen of the other device, or the original or replacement image is displayed on the screen of one of the devices and the screen of the other device being free to display whatever the user of that device wishes.

The master device may recruit the slave device using the same communication interface as that used to collect the contemporaneous image or may use a different communication interface, which uses a different network.

In different embodiments, one of the devices collects the contemporaneous images and/or extracts the three dimensional information and provides the three dimensional information to the other of the devices. The collection or extraction may alternately be performed at a processing device different from the master and slave devices. In this last case, the three dimensional information or replacement background employing the three dimensional information may be subsequently transmitted from the processing device to one or both of the master and slave devices or a remote device over a particular communication interface.

In various embodiments, recruitment of the slave device comprises the master device broadcasting a query to local devices, after which a response is received from available local devices. A request for characteristics of the available devices may then be sent or may be included in the broadcast. After the characteristics are received, a particular device is automatically or manually selected from the available devices to be the slave device. In the case of manual selection, the available devices and one or more of their characteristics may be displayed to the user prior to the selection. A request is sent to the particular device to pair with the master device, and, if authorization is not received, a new device is selected and a new request sent. After one of the available devices receiving the request for authorization agrees and its authorization has been received, that device is paired with the master device as the slave device.

In various embodiments, the master and slave devices may be either the same type of communication devices (e.g., cell phones) or different types of communication devices (e.g., cell phone and laptop computer).

In various embodiments, a communication system is disclosed. The system contains a plurality of devices, at least a first and second of the devices being local and comprising a camera. The first device recruits the second device. One of the paired first or second devices acts as a master device and the other acts as a slave device. The master and slave devices match image capture, image transmission and/or image display characteristics therebetween. After the characteristics have been matched, contemporaneous images are captured by the master and slave devices. These contemporaneous images are collected at one of the plurality of devices and are used to subsequently extract three dimensional information. The contemporaneous images may be collected at the master device, at the slave device or at a different local or remote device. Similarly, the three dimensional information may be extracted at the master device, at the slave device, at the device where the images are collected or at an entirely different device from these devices.

In various embodiments, the master and/or slave device displays and/or transmits one or more of: a single image, a stereoscopic pair of two dimensional images, a disparity map, a depth map, or a three-dimensional image. The single image may be the original, unaltered image or an image derived from (derived image) the original image and the three dimensional information such as a background-substituted image.

As used herein, three dimensional information includes depth information and/or disparity (relative depth) information.

As used herein, a two dimensional image is an image comprised of pixels that have at least intensity and color information corresponding to the portion of the image captured by each particular pixel. A three dimensional image is an image comprised of pixels that have at least intensity, color and depth information corresponding to the portion of the image captured by at least some particular pixels, whether the intensity, color, and depth information are stored together or separately. Each of such images is known in the art. The three dimensional information is used to create an image derived from the original images regardless of texture variations (e.g., clothing and shadow variations). Such imaging offers unique user interface features, including on-the-fly background substitution (replacement of the actual background of the user with a different background such as a boardroom or tropic island), gesture recognition, face tracking, and intuitive gaming interaction. Depth imaging technology using stereoscopic cameras (cameras having different but overlapping fields-of-view) is known in the art. The manner in which three dimensional information may be formed is provided, for example, in U.S. patent application Ser. No. 11/853,338, filed Sep. 11, 2007 and entitled "Method And Apparatus To Facilitate Processing A Three dimensional Image Using First And Second Images To Facilitate Computing A Depth/Disparity Image," herein incorporated by reference in its entirety.

Figure 1:
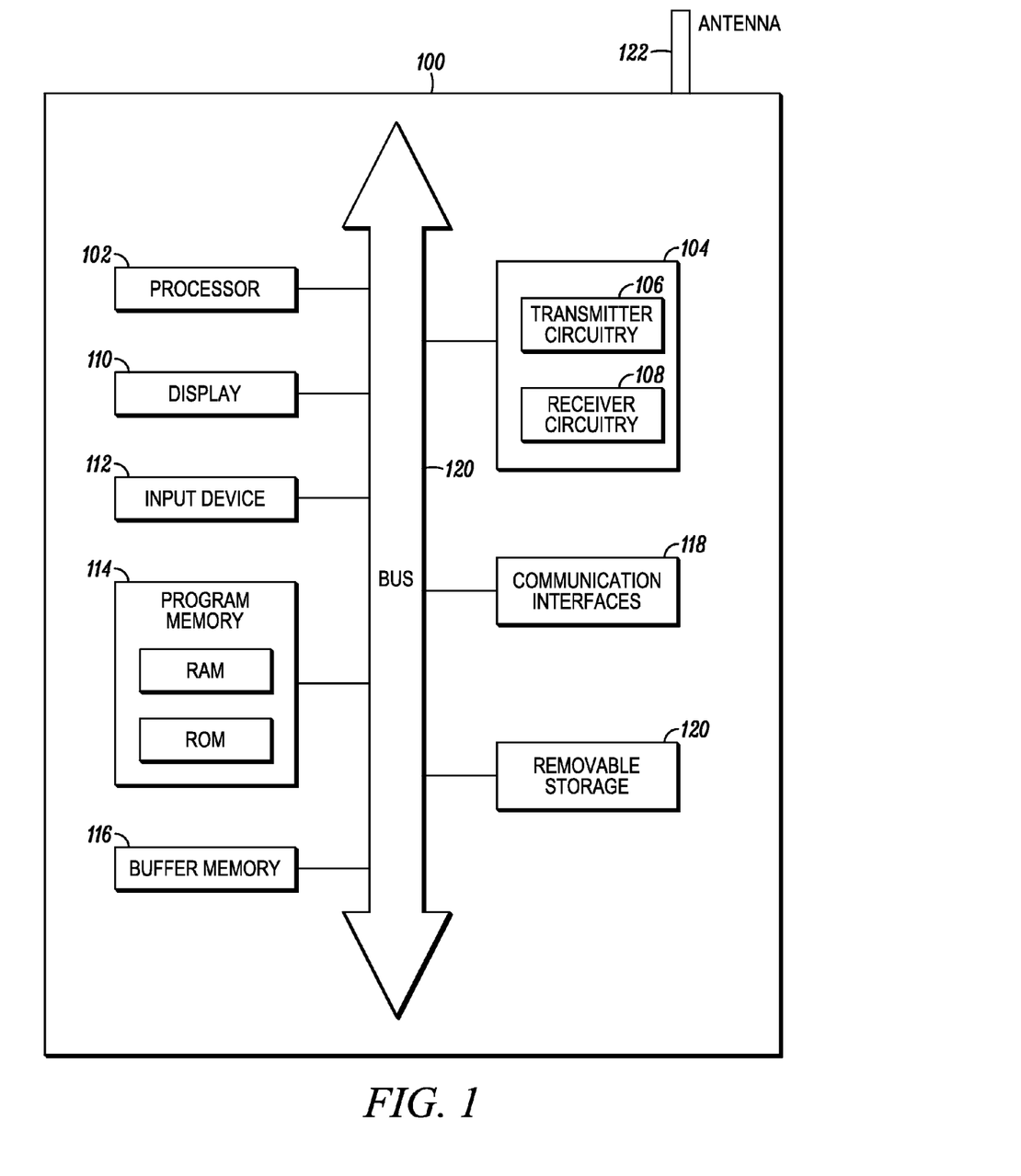
FIG. 1 illustrates a mobile device according to one embodiment.

Mobile devices include personally portable or vehicle-mounted communication devices. Typical mobile devices include cellular (cell) telephones, push-to-talk (PTT) devices, personal digital assistants (PDAs), laptop computers, and others. A block diagram of an exemplary mobile device 100 is shown in FIG. 1.

The device 100 contains, among other components, a processor 102, a transceiver 104 including transmitter circuitry 106 and receiver circuitry 108, a display 110, an input device(s) 112, a program memory 114 for storing operating instructions that are executed by the processor 102, a buffer memory 116, one or more communication interfaces 118, a removable storage 120, and an antenna 122. The device 100 may have one or more additional antennas to transmit on different bands. The device 100 is preferably an integrated unit containing at least all the elements depicted in FIG. 1, as well as any other elements necessary for the device 100 to perform its particular electronic function. Alternatively, the device 100 may comprise a collection of appropriately interconnected units or devices, wherein such units or devices perform functions that are equivalent to the functions performed by the elements of the device 100. For example, the device 100 may comprise a laptop computer and a Wireless Local Area Network (WLAN) card.

The processor 102 preferably includes one or more microprocessors, microcontrollers, DSPs, state machines, logic circuitry, or any other device or devices that process information based on operational or programming instructions. Such operational or programming instructions are preferably stored in the program memory 114. The program memory 114 may be an IC memory chip containing any form of random access memory (RAM) or read only memory (ROM), a floppy disk, a compact disk (CD) ROM, a hard disk drive, a digital video disk (DVD), a flash memory card or any other medium for storing digital information. One of ordinary skill in the art will recognize that when the processor 102 has one or more of its functions performed by a state machine or logic circuitry, the memory 114 containing the corresponding operational instructions may be embedded within the state machine or logic circuitry. The operations performed by the processor 102 and the rest of the device 100 are described in detail below.

The transmitter circuitry 106 and the receiver circuitry 108 enable the device 100 to communicate information packets to and acquire information packets from the other nodes. In this regard, the transmitter circuitry 106 and the receiver circuitry 108 include appropriate, conventional circuitry to enable digital or analog transmissions over a wired or wireless communication channel. For example, the transmitter circuitry 106 and the receiver circuitry 108 are designed to operate wirelessly over an ad hoc networking air interface (e.g., Bluetooth, 802.11 WLAN, Wi-Fi, WiMAX, . . . , etc.). The implementations of the transmitter circuitry 106 and the receiver circuitry 108 depend on the implementation of the device 100. For example, the transmitter circuitry 106 and the receiver circuitry 108 may be implemented as an appropriate wireless modem, or as conventional transmitting and receiving components of two-way wireless communication devices. In the event that the transmitter circuitry 106 and the receiver circuitry 108 are implemented as a wireless modem, the modem can be internal to the device 100 or insertable into the device 100 (e.g., embodied in a wireless RF modem implemented on a Personal Computer Memory Card International Association (PCMCIA) card). For a wireless communication device, the transmitter circuitry 106 and the receiver circuitry 108 are preferably implemented as part of the wireless device hardware and software architecture in accordance with known techniques. One of ordinary skill in the art will recognize that most, if not all, of the functions of the transmitter circuitry 106 and/or the receiver circuitry 108 may be implemented in a processor, such as the processor 102. However, the processor 102, the transmitter circuitry 106, and the receiver circuitry 108 have been artificially partitioned herein to facilitate a better understanding.

The receiver circuitry 108 is capable of receiving RF signals from at least one band and optionally more bands, if the communications with the proximate device are in a frequency band other than that of the network communications. The receiver circuitry 108 may optionally comprise a first receiver and a second receiver, or one receiver capable of receiving in two or more bandwidths. The receiver 108, depending on the mode of operation, may be attuned to receive, for example, Bluetooth or WLAN, such as 802.11, communication signals. The transceiver 104 includes at least one set of transmitter circuitry 106. The transmitter circuitry 106 may be capable of transmitting to multiple devices potentially in multiple frequency bands.

The antenna 122 comprises any known or developed structure for radiating and receiving electromagnetic energy in the frequency range containing the wireless carrier frequencies. The buffer memory 116 may be any form of volatile memory, such as RAM, and is used for temporarily storing received information packets.

The display 110 may be an LCD, OLED, or any other known display that shows text/graphics and images such as phone numbers, text messages, internet information, the user and background, etc. The display 110 may be also be an autostereo display or any other known display that presents text/graphics and images with a three dimensional appearance to users, with or without special viewing aids such as shutter glasses. The input devices 112 include one or more speakers and microphones, an alpha-numeric keyboard, isolated buttons, soft and/or hard keys, touch screen, jog wheel, and/or any other known input device. The input device 112 also includes a camera 110. The camera 110 can be disposed at any location on the device 100 but is usually located on the front or back of the device 100.

The processor 120 may be a conventional processor that is commercially available from Intel™, AMD™, Freescale™, and Cyrix™, among others. Similarly, the memory 122 may be a conventional memory that is commercially available.

The memory 122 may include random-access memory (RAM) and/or read-only memory (ROM) that contain, for example, computer-accessible media. The processor 120 executes computer programs stored on the computer-accessible media.

Mobile devices in general can include one or more hard disk drives, flash memory, floppy disk drives, and optical disk drives. Mobile devices can be communicatively connected to the Internet via a wired or wireless communication interface in a manner well known in the art. Wired connections can be provided using, for example, a modem or Ethernet or similar network card connected to a local-area network (LAN) or a wide-area network (WAN) that itself is connected to the Internet via, for example, a T1 line. Wireless connections can be provided using WiFi or some other connection. The mobile devices may operate on operating systems such as Microsoft Windows®, Apple MacOS®, Linux®, and UNIX®. Examples are not limited to any particular operating system, however, and the construction and use of such operating systems are well known within the art.

Figure 2:
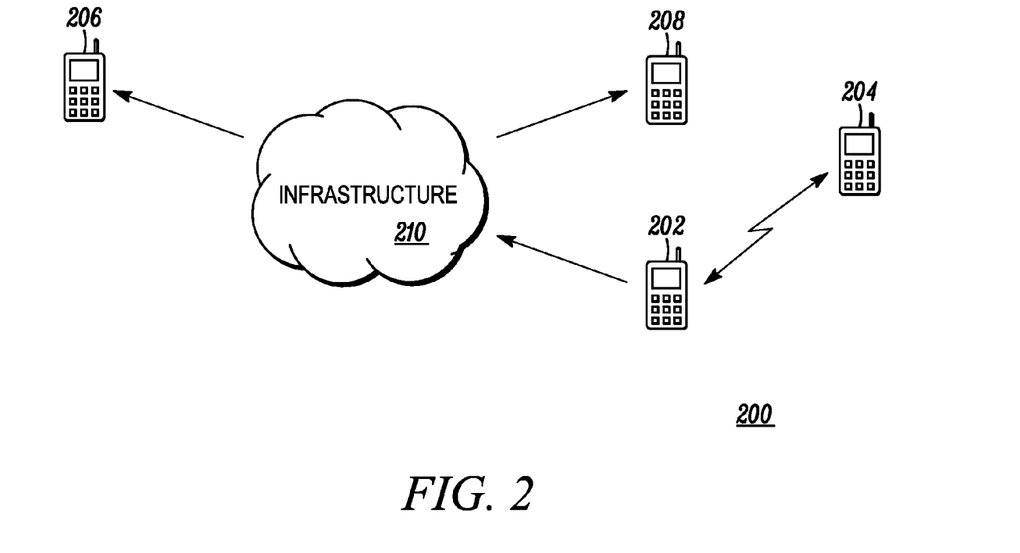
FIG. 2 illustrates an embodiment of a system employing the mobile device of FIG. 1

A system employing the device of FIG. 1 is shown in FIG. 2. As shown, the system 200 contains multiple devices 202, 204, 206, 208, although not all of the elements displayed may be present. In one embodiment, one of the devices (transmitter or master device) 202 provides audio and video information to the other devices (receivers) 206, 208 involved in a communication session, e.g., a teleconference or video game, through infrastructure 210. The infrastructure 210 includes base stations, repeaters, and other known communication elements. In other embodiments, other networks may be used that do not involve the infrastructure. The receivers 206, 208 can be present in one (remote or local) location or in different locations (e.g., different rooms, buildings, cities or countries). As shown in FIG. 1, the receivers 206, 208 are remote from the devices 202, 204 (although they could also be local). The devices 202, 204 are in the same location and each is associated with a camera, as well as optionally a screen. The term "associated with" in this context indicates that the component (camera, screen) may be located on the device or may be physically separate from, but linked to (in communication with), the device. The devices 202, 204 are local to each other (e.g., in the same room or within several feet of each other) and their cameras are directed such that they have intersecting but different fields of view. The relative locations of the cameras may remain constant as successive images are taken (to form each frame in a video) or may change between different frames.

The master device 202 initially "recruits" a secondary device 204 as a slave device to provide an image from its associated camera for use in creating the three dimensional information. This recruitment may occur through direct transmissions between the master device 202 and the slave device 204 or, in another embodiment, through an intermediary device (not shown), in either case being performed through the wired or wireless communication interface. As is known, a master device controls various aspects of the slave device through a communication interface, which may be different from the communication interface used to transmit data to the infrastructure 210 and/or that used to recruit the slave device 204. The master device 202 may send out a request for the user of the slave device 204 to accept the recruitment or may, if the slave device 204 is set in an automatic acceptance mode, co-opt the slave device 204 automatically without having a separate request be accepted manually by the user of the slave device 204 using an input of the slave device 204.

After the master and slave devices 202, 204 are linked contemporaneous images are taken by the master and slave devices 202, 204. These contemporaneous images are combined to produce the three dimensional information and the two or three dimensional image eventually displayed. The term "contemporaneous" as used herein refers to images captured (i.e., taken by the camera) such that the subject of the images is essentially in the same place (generally within a fraction of a second of each other) and thus able to be captured and the contemporaneous images combined to extract the three dimensional information. The captured image may be transmitted from the slave device 204 to the master device 202 or vice-versa or from both the master device 202 and slave device 204 to a separate device that processes the images. When transmitting the image(s), the communication interface used to establish the link between the master device 202 and slave device 204 may be used or a different communication interface, such as the communication interface used to transmit data to the infrastructure 210, may be used.

The images may be collected and then combined at various locations; for example: at the location of the master device 202 and slave device 204 (e.g., by the master device 202 and/or slave device 204 if processing resources are shared by the master device 202 and slave device 204, or by an entirely separate not shown processing unit), at the locations of the receivers 206, 208 (e.g., by the receivers 206, 208 or by an entirely separate not shown processing unit), or in the infrastructure 210. The location at which the images are collected and the location at which the three dimensional information extracted from the images may be the same or different. For example, the images from the different cameras may be collected and the three dimensional information extracted at the location of the master device 202 if sufficient processing capability is available or at the location of the individual receivers 206, 208 if not. In one embodiment, each image is a single frame from a series of frames of a video taken by the camera.

In some embodiments, individual frames may not be processed and/or transmitted if there is an insufficient amount of change from one frame to the next, thereby conserving bandwidth. In such a situation, the previous frame, which is stored at the location where the images are to be combined, is used. The decision of whether or not there is sufficient movement is performed automatically using an algorithm that compares, e.g., the most recent frame from the device (stored so that it is readily accessible to the processor that processes the images) to the new frame from the device. The frames may be stored at the device processing the images or at a separate device that is accessible to the device processing the images. Other methods of visual or non-visual change detection are well known and will not be further described herein for brevity.

To enable the processing, the master device and slave device are networked by known wired or wireless connections. An example of the former is linking the devices through the USB ports of the devices, while an example of the latter is linking the devices through a Bluetooth™ or IR connection. Networking using such connections ensures data from the cameras of the master device and slave device are provided in a timely manner for further processing and transmission, thereby permitting coordination of the cameras to form a three dimensional depth image.

The various characteristics of the master device and slave device are automatically determined and, once networked, set and used to enable processing of the contemporaneous images to form the three dimensional image as well as provide visual and audio output from the devices. For example, the relative position and orientation of the cameras is calibrated using known calibration methods, for example, calibration methods taught in Hartley and Zisserman, "Multiple View Geometry in Computer Vision," $2^{nd}$ edition, Cambridge University Press, 2004. In addition, the devices are synchronized so that the contemporaneous images are provided to extract the correct three dimensional information. The characteristics include image capture, image transmission or image display characteristics such as camera resolutions, image sizes, and rate of transfer of the frames (frame rate), which are set to correspond to each other. Additional characteristics comprise focal length, the size and aspect ratio of pixels, and other characteristics pertaining to the optical and geometric properties of the cameras.

The process of providing the images of the devices may include feedback to the user to help aim one or both of the cameras for better three dimensional coverage. In such an embodiment, the cameras perform auto-calibration of their stereo geometry and/or determine the overlap between the fields of view. An audio or visual indication is then provided to the user of the master and/or slave device to, for example, pan, tilt, or slide one or both of the devices in a certain direction to increase the overlap between the fields of view or to improve the two cameras' angles of view to optimize depth perception. For example, achieving good depth segmentation of foreground and background can be facilitated by optimal camera spacing—the two cameras may be disposed a few inches apart when capturing a subject that are relatively close to the cameras and the distance separating the cameras increase as the distance between the cameras and the subject increases. This process may be performed iteratively, with the manual adjustment continuing until it is automatically determined that the most advantageous overlap is achieved and the position established to be able to extract the three dimensional information and enable creation of the desired three dimensional image.

In addition, the three dimensional image derived from the master device and slave device can be combined with a three dimensional image derived elsewhere (e.g., at the location of one or more of the receivers 206, 208) during communication sessions such as teleconferencing, gaming, or other environments where it may be desirable for three dimensional images interact with each other or with their environment. Such an embodiment permits the users at each location to appear as if they are present at the same location, rather than appearing in separate frames, e.g., in a conventional two dimensional split screen view. As above, rather than transmitting data through the infrastructure, the system can use the images from the master device and slave device solely locally.

Figure 3:
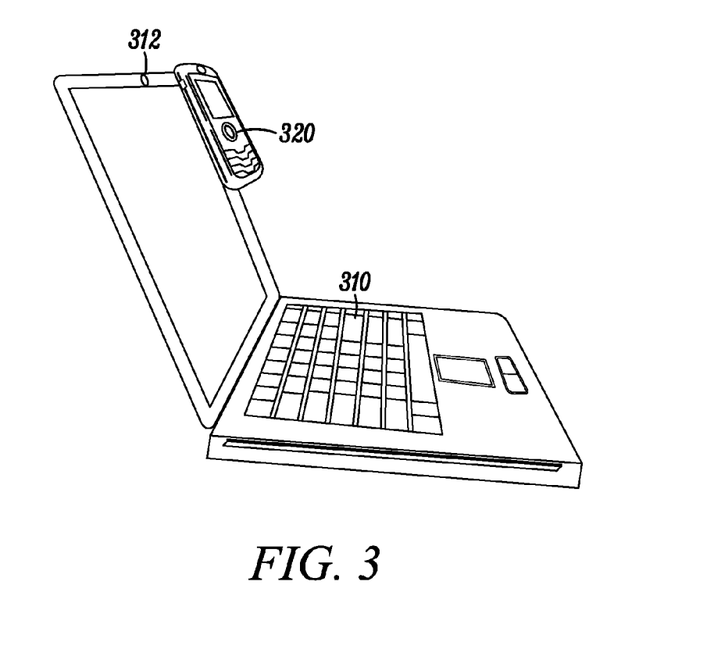
FIG. 3 shows an embodiment of different mobile devices whose camera images may be combined.
Figure 4:
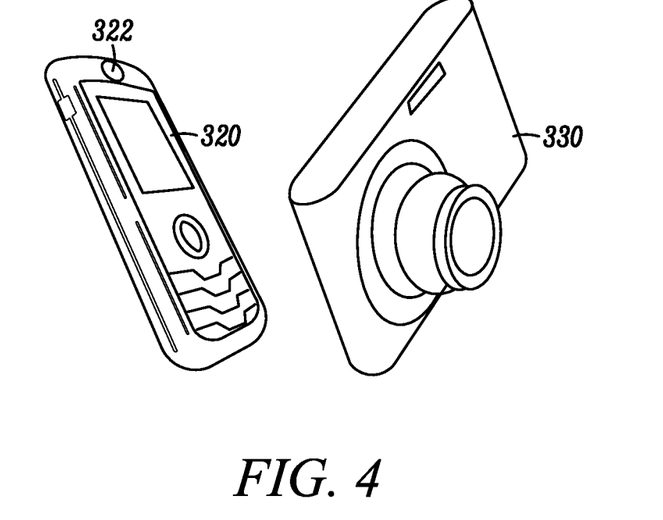
FIG. 4 shows another embodiment of different mobile devices whose camera images may be combined.
Figure 5:
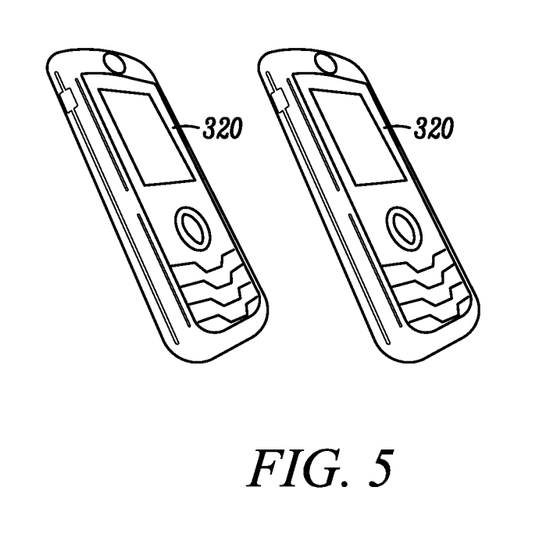
FIG. 5 shows an embodiment of similar mobile devices whose camera images may be combined.
Figure 6:
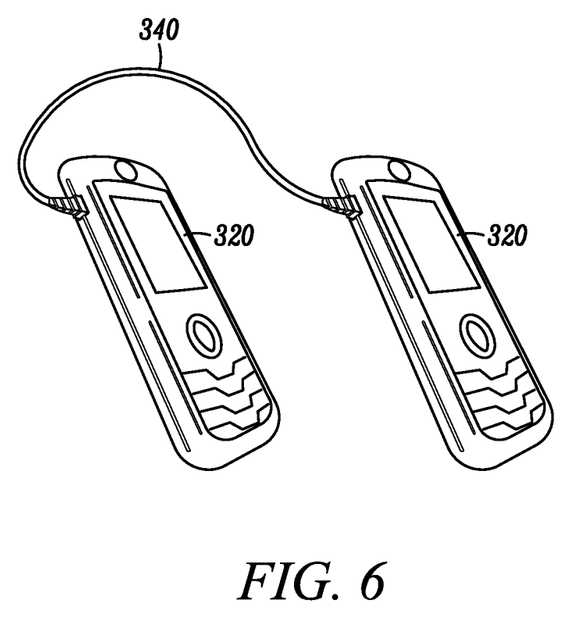
FIG. 6 shows another embodiment of similar mobile devices whose camera images may be combined.

Examples of various types of mobile devices whose camera images may be combined to extract the three dimensional information are illustrated in FIGS. 3-6. As shown, either the same type of devices or different types of devices can be wired or wirelessly linked. As shown in FIG. 3, a laptop computer 310 with built-in camera 312 is wirelessly connected to a cell phone 320. Although the camera 312 of the laptop computer 310 is shown as being built-in, it may be connected separately, as is well known in the art. In either case, the camera 312 is associated with the laptop computer 310. The camera 322 of the cell phone 320 as illustrated in FIG. 4 may be wirelessly connected to a digital camera 330 set to take streaming video and/or pictures at discrete intervals. In other embodiments, two cell phones 320 may be connected wirelessly or through a USB cable 340, as shown respectively in FIGS. 5 and 6. The connections shown in FIGS. 3 and 4 may be wired and the various wired connections may be achieved by connectors other than a USB cable. The phone and laptop combination may be relatively more attractive to working professionals, who likely have this combination available, while the two-phone combination may be more attractive for social networking scenarios, in which two users collaborate on a game or a videoconference with a third party.

The displays on the two devices may be coupled in addition to the cameras being coupled. Thus, data can be transmitted between the master and slave devices such that the images displayed on the screens of the devices are different. For example, instead of one screen displaying both the other party in the videoconference call and a self-monitoring image, these could be displayed on the different separate screens. Alternatively, if background substitution is being employed, one screen may be used to display the unaltered video image (that is, with the actual background). For example, the image with substitute background may be displayed on the largest screen (or screen with the best resolution) of the devices, while the image with original background may be displayed on the other device. This permits the users to be alerted to anything happening in their real background that might disrupt the illusion conveyed by the background substitution, such as a third person approaching. If background substitution is employed, the devices may take advantage of sensors that determine orientation, position, velocity and acceleration of the devices to better match the substitute background if one or more of the devices moves. The selection of which device displays which image may be automatic (such as being dependent on the screen characteristics for example) or user selected. In other embodiments, one or both of the devices can show a three dimensional image if it has the proper equipment.

In a number of instances, the resolutions of the cameras (and thus images) will differ. If the resolutions of the cameras of the master and slave devices differ, the resolution of one or both of the images received is/are adjusted until the same resolution is achieved. For example, the lower-resolution image may be processed to provide a higher-resolution image, although the resolution enhancement may be somewhat limited by the algorithm used as well as the processing power (and time frame for processing) available. It may be more desirable to reduce the resolution of the higher-resolution image to that of the lower-resolution image due to processing power used in the time constraints. Algorithms for enhancing or reducing image resolution are well known and will not be further described herein for brevity.

Turning to one example, the Motorola RAZR2™ has a 320×240 Quarter Video Graphics Array (QVGA) display, a 2 megapixel camera, a USB 2.0 high speed wired interface that can transfer data at rates up to 480 Mbps, and a Bluetooth Class 2, v2 wireless interface that can transfer data at rates up to 3 Mbps. A good quality 320×240 video stream can be produced with as little as a 300 Kbps data rate. The camera can provide higher resolutions than the 320×240 display. A good quality 640×480 resolution image, which can be produced with as little as a 1 Mbps data rate, provides higher resolution images, which can subsequently be down-sampled back to 320×240, leaving very few processing artifacts and enhancing the quality of the final processed image. Both rates are within the capabilities of the cell phone and thus, such a phone can be used to provide one of the high-resolution video streams for high-quality three dimensional depth imaging.

Figure 7:
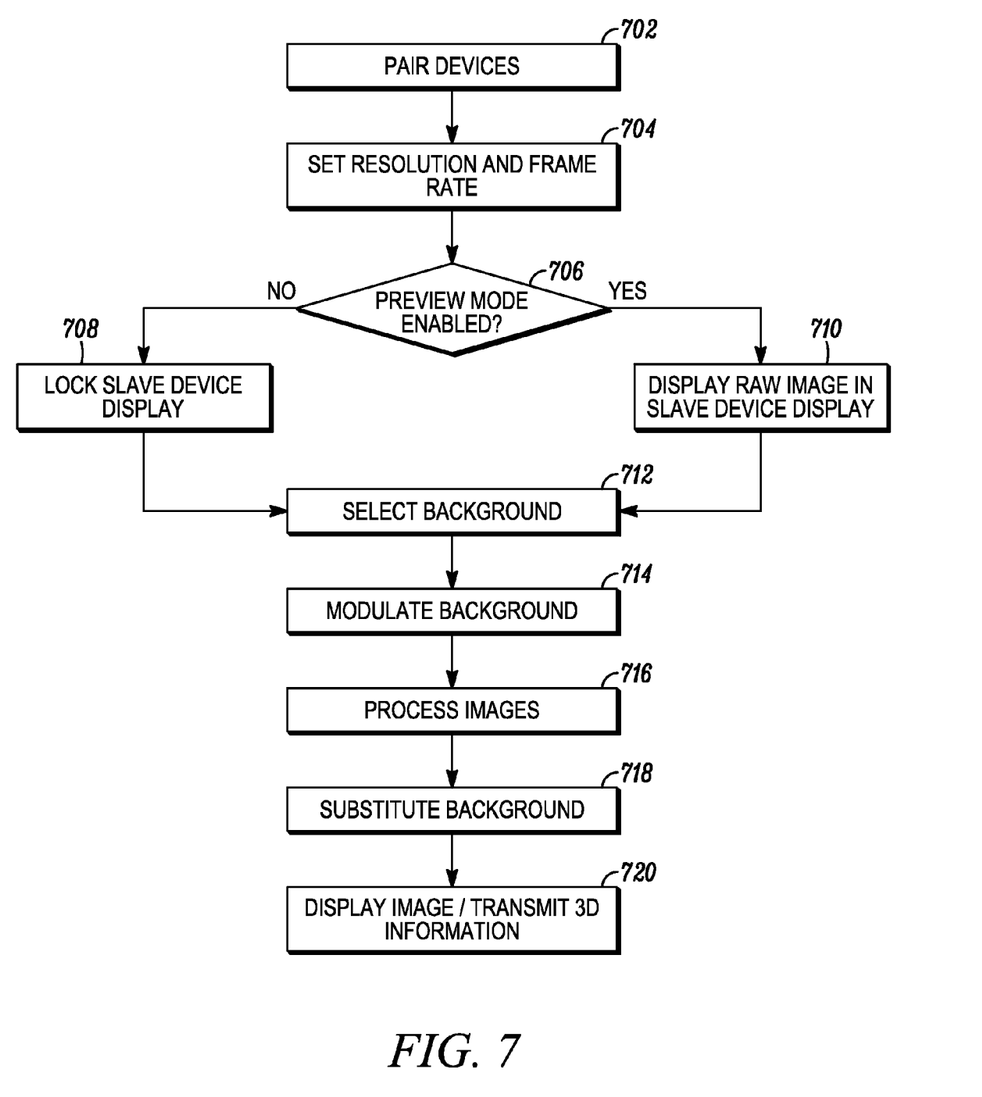
FIG. 7 is a flowchart of forming a three dimensional image according to one embodiment.

One embodiment of a method of providing three dimensional information is shown in the flowcharts of FIGS. 7 and 8A-8C. In the flowchart of FIG. 7, the master device and slave device enter communication range of each other and establish communication, pairing with each other at step 702. Characteristics such as the resolution and frame rate of the video frames from the devices are negotiated until an agreement is reached at step 704. As is known, a master device controls various aspects of the slave device through a particular communication interface, which is often different from the communication interface used to transmit data to the infrastructure. Prior to images being displayed, it is determined whether a preview mode is enabled in the slave device at step 706. If the preview mode has not been enabled, the display of the slave device is locked at step 708 so that it will display the same processed image as on the screen of the master device. In the preview mode, the slave device will display the raw unprocessed image on its screen at step 710. After the determination, a substitute background is selected by the user at step 712. This background is then modulated depending on the movement of each device at step 714. The image from the devices is processed to extract the three dimensional information at step 716, the background is then substituted at step 718, and the resulting image displayed and/or transmitted and/or the three dimensional information is transmitted or otherwise employed, e.g., to form a three dimensional image at step 720. The background can be substituted in each image with or without employing the three dimensional information.

Figure 8A:
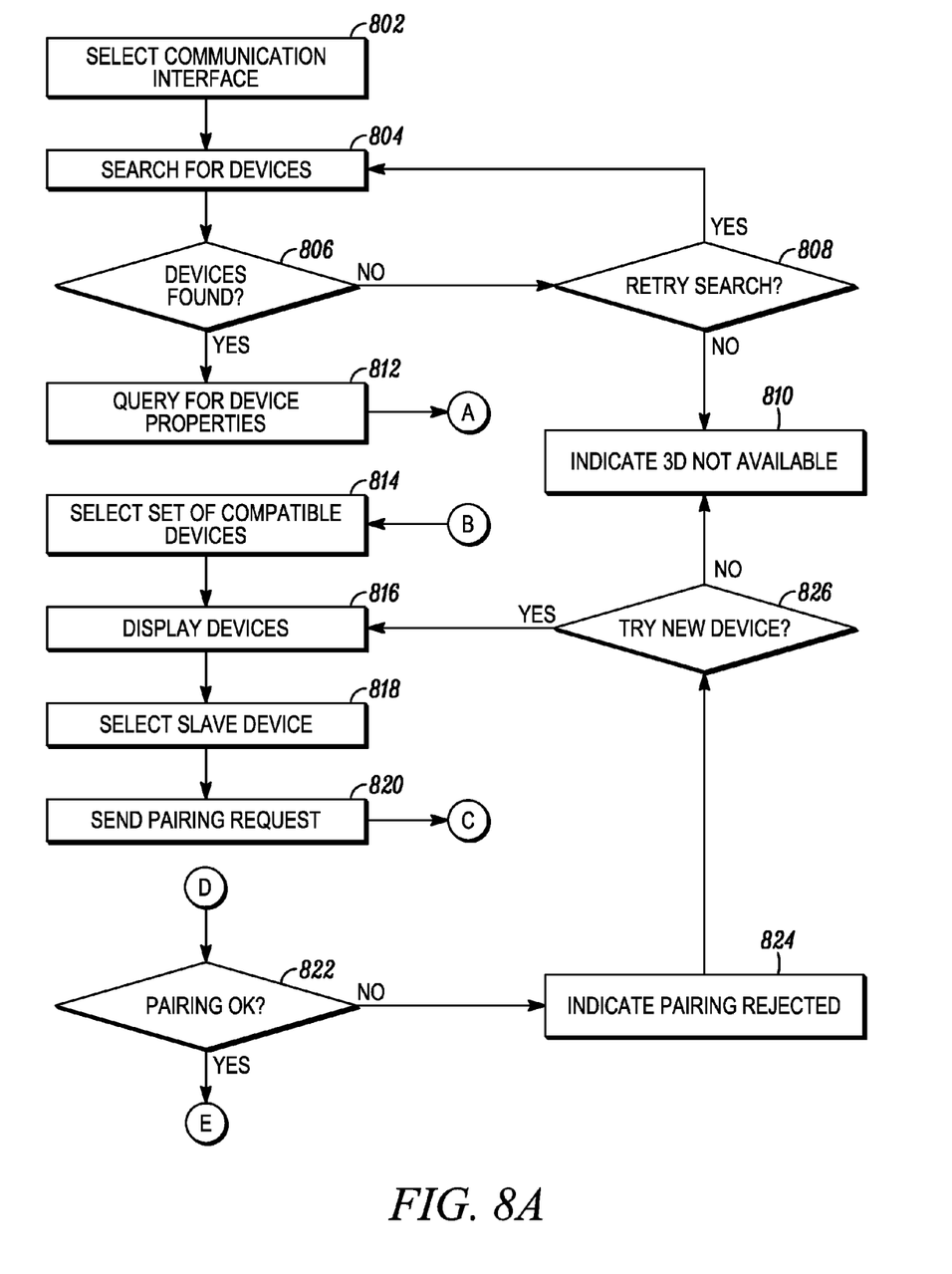
FIGS. 8A and 8B are an embodiment of detailed flowcharts of the method of FIG. 7 for the master device and FIG. 8C is an embodiment of a detailed flowchart of the method of FIG. 7 for the slave device Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments of shown.
Figure 8B:
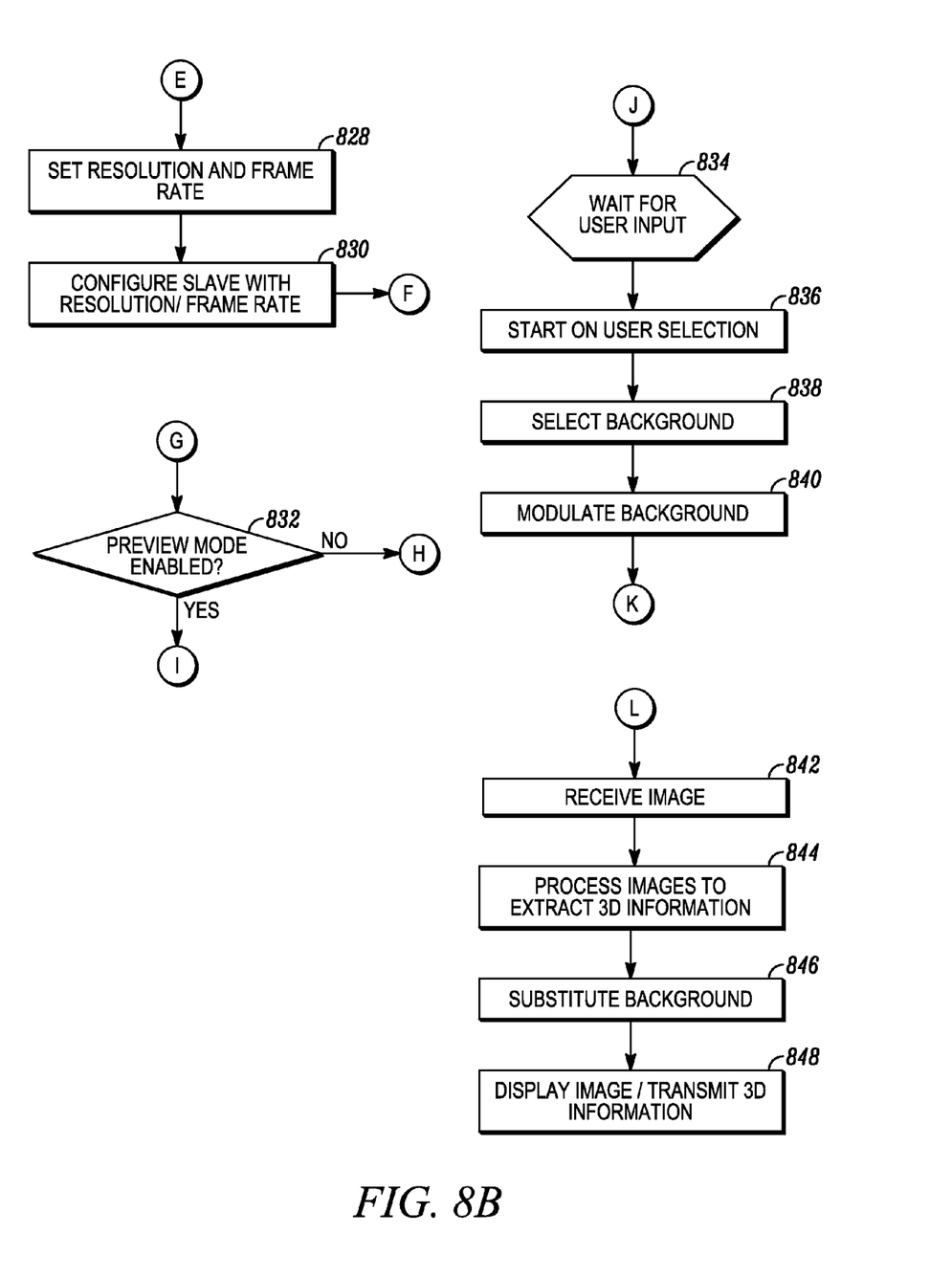

Detailed flowcharts of the method of FIG. 7 are shown in FIGS. 8A and 8B for the master device and shown in 8C for the slave device. The master device selects the communication interface through which to communicate to the slave device at step 802 from one or more available communication interfaces. The communication interface can be selected from a list of one or more default interfaces or an interface most recently used by the master device to communicate previously with a slave device. Once the communication interface is selected, the master device then searches for devices available to communicate with the master device using the communication interface at step 804, e.g., by broadcasting a signal to all devices and waiting for responses. If it is determined that no devices are available at step 806, it may prompt the user of the master device to enter whether to retry the search at step 808. If the user indicates that the search is to be re-initiated (alternatively, the search can be automatically attempted a predetermined number of times, waiting a specified time in between attempts), the master device again searches for devices at step 804. If the user indicates that the search is not to be re-initiated, the master device indicates on its screen that three dimensional information is not available at step 810, and a conventional two dimensional image (with or without background substitution) is displayed at various locations and transmitted to other locations.

After allowing for a sufficient amount of time for responses from the devices (i.e., devices are found) at step 806, the master device sends an information request to each device through the selected communication interface at step 812. The devices are queried about their abilities and characteristics, such as camera resolution, screen resolution, remaining battery, and other elements that may be of interest when combining the devices. The master device stores the responses and selects a set of compatible devices from the stored responses at step 814. Devices may be incompatible for a variety of reasons, e.g., no camera or display or low power. In addition, certain devices may be set to "master device" mode (and thus not amenable to becoming a slave device of a different unit) or may be a slave device that is already paired to another master device, thereby being unavailable to the master device currently attempting to pair.

Once the available devices are listed, they may be displayed on the screen of the master device at step 816 for the user of the master device to select using one of the input devices of the master device. The screen may display only the available devices, or may also display the features/characteristics of each device to allow for the user to select the device that best fits the use. Alternatively, the master device may automatically scan the list and determine the most appropriate slave device to employ using a predetermined set of criteria, for example, optimum camera resolution for three dimensional processing in conjunction with the master device, highest available battery life, or greatest ease of physical manipulation. Once the slave device has been selected at step 818, the master device sends a request to pair the device with the master device at step 820.

The master device receives a response from the device and determines if the device has accepted the pairing at step 822. If the pairing has been rejected, the master device may visually, audibly, and/or haptically indicate this to its user at step 824. After rejection, the master device may request from its user whether to attempt pairing with a new device. The master device receives an input from the user, prompted by a request on its screen, as to whether a new pairing with a different device should be attempted. If the user indicates that pairing to a new device is not to be attempted, the master device indicates on its screen that three dimensional information is not available at step 810, and a conventional two dimensional image is displayed. If the user indicates that pairing to a new device is to be attempted, the master device again displays the list of available devices (removing the device that rejected the pairing) on the master device at step 816 or automatically attempts to pair with another device.

In the embodiment shown in FIG. 8, once a particular selected device has accepted the pairing to become a slave device, the master device determines characteristics, such as image resolution and frame rate for transmission, that are supported by both devices at step 828 and configures the slave device with these characteristics by sending a specialized configuration command at step 830. The master device then determines whether to enable the preview mode at step 832 and if not sends a command to the slave device to lock the screen of the slave device to display the same image as that displayed by the screen of the master device at step 868 and optionally displays that the screen is locked at step 870. Thus, the slave device either processes the image concurrently with the master device or receives the same image as that displayed by the master device. The user also selects a new background from a list of substitute backgrounds (which can be done before or after pairing of the master device with the slave device, and which may be still image or video backgrounds) at step 834. After the user selection has been received at step 836, the desired background is selected at step 838 and modulated at step 840.

After modulation of the background at step 840, the image from the camera of the slave device is received by the master device at step 842. The images from the cameras of the master device and slave devices are then processed to extract three dimensional information at step 844, this information employed for example to provide a more realistic substitute background at step 846 and then the image, with or without substitute background, is displayed at step 848. The image or three dimensional information may additionally be transmitted.

Figure 8C:
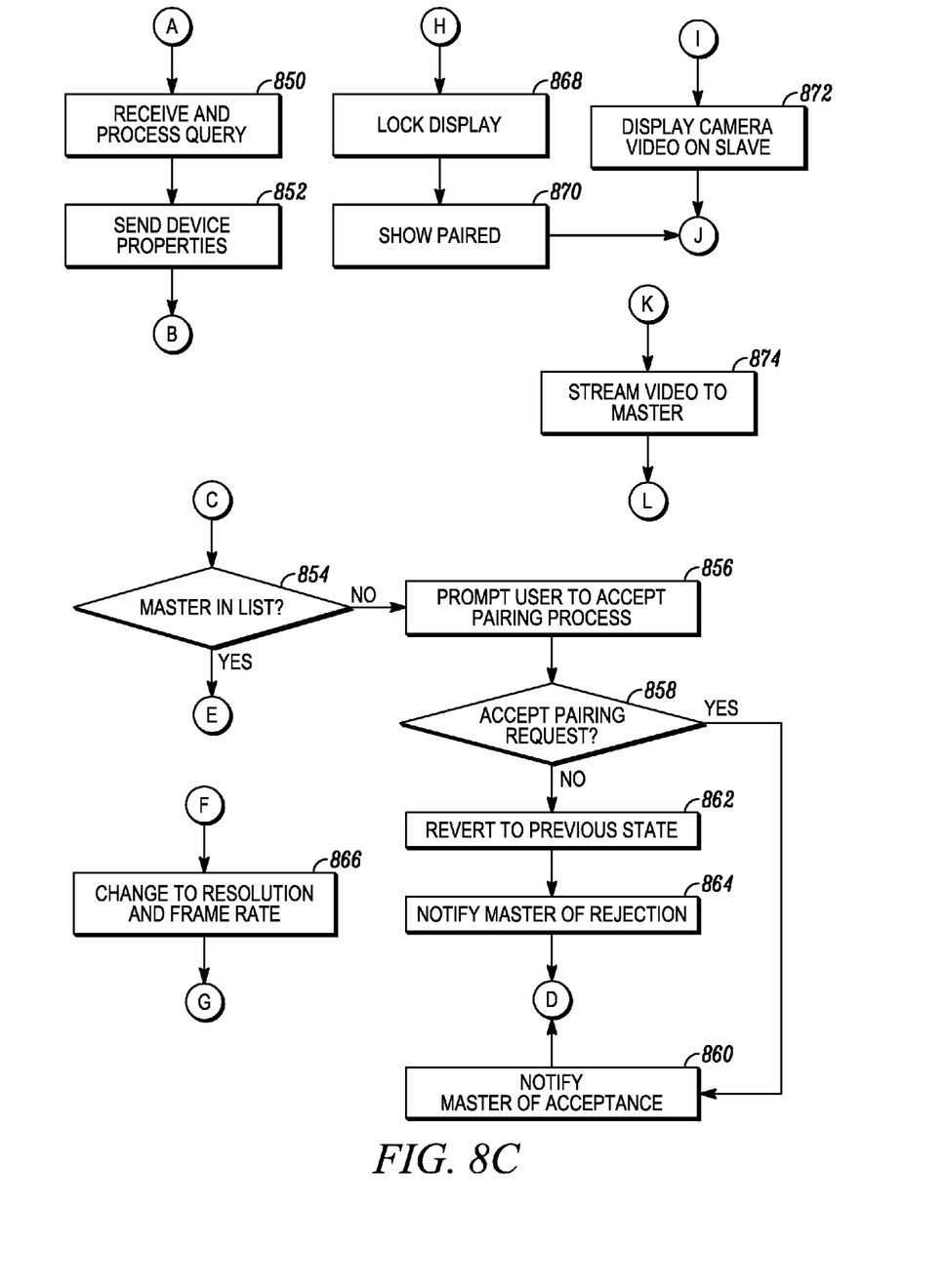

As shown in FIG. 8C, at step 850 the device receives and processes the initial query from the master device and, in response, sends its properties to the master device at step 852. At step 854, the device receives the pairing request from the master device and determines whether to accept the master device. If so, the slave device sends a response automatically, without user input, to the master device, where the master device proceeds to determine the resolution and frame rate at step 828. If the master device is not set to automatically accept the slave device, the slave device prompts the user to accept the pairing process with the master device at step 856. If the slave device determines that the user has accepted the pairing request (via a user input) at step 858, it notifies the master device of this acceptance at step 860, whereas if the slave device determines that the user has not accepted the pairing request at step 858, the slave device reverts to its original state at step 862 and notifies the master device of rejection of slave device status at step 864. In either case, the master device receives this notification and determines whether or not the pairing has been accepted at step 822.

After the master device has determined that the preview mode is not enabled at step 832 and sent a command to the slave device to lock the screen of the slave device, the slave device, in response, locks its screen at step 868, e.g., displaying the combined image as well as the message "paired" on the screen at step 870. If the preview mode has been enabled, the screen of the slave device shows the unprocessed image from its camera at step 872. The slave device continues by sending the image from its camera to the master device at step 874.

In addition to wired and short range wireless communication links described above, longer range wireless communication is possible in scenarios in which the two devices are placed too far apart for Bluetooth communication. Peer-to-peer communication is an element used in many mesh and cognitive radio communication concepts and may be used to pass image data between two widely spaced devices. Increasing the distance between the devices is useful for depth imaging large subjects at greater distances from the devices.

Methods of autocalibrating three dimensional cameras are well known, for example in the field of robotic vision (see the above Hartley and Zisserman reference). Calibration problems may be reduced through the use of brackets or other permanent fixtures in the location from which the transmitter is transmitting. In this case, although the devices themselves may be mobile, one or more of the devices may be temporarily mounted in brackets and connected, e.g., using a rigid micro-USB cable that establishes a fixed distance between the two cameras. Although it would be better for the devices to be fixed in particular positions, if the devices are not fixed in a particular position, known anti-jitter software can be used to compensate for motion if, e.g., one of the devices is being carried or otherwise is in motion during image capture and autocalibration can be re-performed as necessary.

Although only two devices are shown, more than two devices may provide images for extraction of the three dimensional information. The number of devices used may depend on a number of factors, including the ability of the devices to transmit their individual images in a timely manner, the algorithms used to combine the images, and the processing ability of the device combining the images. Algorithms for combining more than two images are known in the art (see the above Hartley and Zisserman reference).

In addition to the camera of the slave device being used in conjunction with the camera of the master device, other components of the slave device may similarly be joined to provide additional functionality. For example, the microphone on the slave device may be used as a second microphone for applications using multiple microphones, such as nullification of background noise. Similarly, the antenna of the slave device may be used to transmit the image (either captured by the slave device camera) or the three dimensional information in conjunction with that transmitted from the master device for multiple-input-multiple-output (MIMO)-like schemes to increase the data rate of communication.

Although FIG. 2 illustrates an embodiment in the transmitter and master device are the same device, in other embodiments, the slave device may be the transmitter. For example, in the cell phone-laptop combination shown in FIG. 3, the laptop has more computing power and a better display and thus may act as the master device, while the cell phone acts as the transmitter and communicate over its network. Further, in other embodiments, only one of the master and slave devices may have a screen. In this case, one of the images described above is displayed on this screen.

In various embodiments of the present invention, some of the disclosed methods may be implemented as a computer program product for use with a communication device. Such implementations may include a series of computer instructions fixed either on a tangible medium, such as a computer readable medium (e.g., a diskette, CD-ROM, ROM, or fixed disk). The medium may be a tangible medium (e.g., optical or analog communications lines). The series of computer instructions embodies all or part of the functionality previously described herein with respect to the device. Those skilled in the art should appreciate that such computer instructions can be written in a number of programming languages for use with many device architectures or operating systems. Furthermore, such instructions may be stored in any memory device, such as semiconductor, magnetic, optical or other memory. It is expected that such a computer program product may be distributed as a removable medium with accompanying printed or electronic documentation (e.g., shrink wrapped software) or preloaded with a device (e.g., on system ROM or fixed disk). Of course, some embodiments of the invention may be implemented as a combination of both software (e.g., a computer program product) and hardware. Still other embodiments of the invention are implemented as entirely hardware, or entirely software (e.g., a computer program product).

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Those skilled in the art will recognize that a wide variety of modifications, alterations, and combinations can be made with respect to the above described embodiments without departing from the spirit and scope of the invention defined by the claims, and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by any claims issuing from this application and all equivalents of those issued claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of providing three dimensional information, the method comprising:
   a master electronic device, having a first coupled camera, wirelessly querying for other electronic devices with a second coupled camera within proximity to the master electronic device to participate in extracting three dimensional information;
   the master electronic device wirelessly receiving a query response from at least a particular one of the other electronic devices;
   the master electronic device recruiting the particular one of the other electronic devices for pairing with the master electronic device, the particular electronic device serving as a slave electronic device to the master electronic device;
   the master electronic device wirelessly obtaining image processing characteristics for the slave electronic device and, based on the wirelessly obtained characteristics, self-determining image capture characteristics for the slave electronic device;
   the master electronic device determining image capture characteristics for the master electronic device;
   storing, at one of the master electronic device, the slave electronic device, and a remote electronic device, an image contemporaneous captured from each of the master and slave electronic devices using the respective determined image capture characteristics of the master and slave electronic;
   extracting, at one of the master electronic device, slave electronic device, and remote electronic device, three dimensional information from the stored images and providing the extracted three dimensional information to one of the master electronic device and slave electronic device;
   employing the three dimensional information in replacing an original background of at least one of the images with a substitute background to form a replacement image containing the substitute background; and
   displaying the replacement image on the screen of at least one of the master and slave electronic devices.

2. The method of claim 1, further comprising employing the three dimensional information to display an image on a screen at one of the master and slave electronic devices.

3. The method of claim 1, further comprising transmitting the three dimensional information to a second remote device over a first communication interface, the slave electronic device being recruited by the master electronic device through a second communication interface that employs a different type of network from the first communication interface.

4. The method of claim 1, further comprising:
displaying one of the images with its original background as captured by one of the master and slave electronic devices on the screen of the other one of the master and slave electronic devices.

5. The method of claim 1, wherein a first communication interface through which the master electronic device recruits the slave electronic device is different from a second communication interface through which the master electronic device receives the image contemporaneously captured from the slave electronic device.

6. The method of claim 1, wherein at least one of the master and slave electronic devices extracts the three dimensional information and provides the three dimensional information to the other of the master and slave electronic devices.

7. The method of claim 1, wherein the extraction is performed at the remote electronic device, different from the master and slave electronic devices, the three dimensional information being transmitted from the remote electronic device to the master and slave electronic devices after being extracted from the collected images.

8. The method of claim 1, wherein the extraction is performed at the remote electronic device different from the master and slave electronic devices, the remote electronic device also employing the three dimensional information to provide background replacement information for replacement of original backgrounds of at least one of the contemporaneous images, the background replacement information being subsequently transmitted from the remote electronic device to the master and slave electronic devices.

9. The method of claim 1, wherein the master electronic device recruiting the slave electronic device further comprises the master electronic device:
receiving a plurality of responses to the querying from a plurality of other electronic devices;
transmitting a request for characteristics to each of the plurality of other electronic devices;
receiving characteristics from each of the plurality of other electronic devices;
selecting the particular one of the other electronic devices to be the slave device;
sending a request to the particular one of the other electronic devices to pair with the master electronic device; and
receiving authorization from the particular one of the other electronic devices to pair with the master electronic device such that the particular one of the other electronic devices is paired with the master device as the slave device, the selecting and sending being repeated to different ones of the plurality of other electronic devices until the authorization is received.

10. The method of claim 9, wherein recruiting the slave electronic device further comprises the master electronic device automatically selecting the particular one of the other electronic devices based on the received characteristics, the particular one of the other electronic devices having characteristics most closely matching the characteristics of the master electronic device.

11. The method of claim 9, wherein recruiting the slave electronic device further comprises the master electronic device providing a list of the plurality of other electronic devices on the screen of the master electronic device and receiving a user input selecting the particular one of the other electronic devices.

12. The method of claim 9, wherein the request for characteristics is sent substantially simultaneously with the querying.

13. The method of claim 1, wherein the master and slave electronic devices are different types of communication devices selected from a laptop, a mobile phone, and a wireless-enabled camera.

14. The method of claim 13, wherein the master and slave electronic devices are both mobile phones.

15. A master communication device comprising:
a camera;
wireless transmitter circuitry;
wireless receiver circuitry; and
a processor configured to:
wirelessly query, via the transmitter circuitry, for other electronic devices with a second coupled camera within proximity to the master communication device to participate in extracting three dimensional information;
wirelessly receive, via the receiver circuitry, a query response from at least a particular one of the other electronic devices;
recruit, using the transmitter and receiver circuitry, the particular one of the other electronic devices for pairing with the master communication device, the particular electronic device serving as a slave electronic device to the master communication device;
wirelessly obtain image processing characteristics for the slave electronic device and, based on the wirelessly obtained characteristics, self-determine image capture characteristics for the slave electronic device;
determine image capture characteristics for the master communication device and transmit a command to the slave electronic device including the determined image capture characteristics of the slave electronic device using the transmitter circuitry;
receive and store an image contemporaneously captured from each of the slave electronic device and the master communication device using the determined image capture characteristics;
extract three dimensional information from the stored images;
employ the three dimensional information in replacing an original background of at least one of the images with a substitute background to form a replacement image containing the substitute background; and
arrange for display of the replacement image on the screen of at least one of the master and slave communication devices.

16. The device of claim 15, wherein the processor, using the transmitter circuitry, is further configured to transmit the three dimensional information over a first communication interface that is different from a second communication interface through which the slave electronic device is recruited, the first and second communication interfaces employing different types of networks.

17. The device of claim 15, wherein the processor is further configured to employ the three dimensional information to provide a substitute background for replacement of original backgrounds of the contemporaneous images from the master communication device and the slave electronic device to form replacement images and to send a command to the slave electronic device such that one of:
a screen of the slave electronic device is locked so that the replacement image of one of the master communication device and the slave electronic device is displayed on screens of both the master communication device and the slave electronic device; and the replacement image of one of the master communication device and slave electronic device is displayed on the one of the master communication device and slave electronic device and the contemporaneous image of the other of the master communication device and slave electronic device is displayed on the screen of the other of the master communication device and slave electronic device.

18. The device of claim 15, wherein in recruiting the slave electronic device the processor of the master communication device is further configured to:

receive a plurality of responses to the query from a plurality of other electronic devices using the receiver circuitry;

transmit a request for characteristics to each of the plurality of other electronic devices using the transmitter circuitry;

receive characteristics from each of the plurality of other electronic devices using the receiver circuitry;

send a request to a particular one of the other electronic devices selected from the plurality of other electronic devices to pair with the master communication device using the transmitter circuitry; and receive, using the receiver circuitry, authorization from the particular one of the other electronic devices to pair with the master communication device such that the particular one of the other electronic devices is paired with the master communication device as the slave electronic device, the sending being repeated to different ones of the plurality of other electronic devices until the authorization is received.

19. A communication system comprising:

a second electronic devices that comprises a camera;

a first electronic device that is local to the second electronic device and that comprises another camera, wherein the first electronic device is configured to:

act as a master electronic device and wirelessly query for other electronic devices within proximity to the first electronic device to participate in extracting three dimensional information;

wirelessly receive a query response from the second electronic device and recruits the second electronic device as a slave electronic device to the first electronic device for the purpose of extracting three dimensional information;

wirelessly obtain image processing characteristics for the slave electronic device and, based on the wirelessly obtained characteristics, self-determine image capture characteristics for the slave electronic device;

determine image capture characteristics for the master electronic device;

store an image contemporaneously captured from each of the master and slave electronic devices using the respective determined image capture characteristics, the stored images being employed to extract three dimensional information;

employ the three dimensional information in replacing an original background of at least one of the images with a substitute background to form a replacement image containing the substitute background; and arrange for display of the replacement image on the screen of at least one of the master and slave electronic devices.

* * * * *